(12) United States Patent
Lei et al.

(10) Patent No.: US 10,890,681 B2
(45) Date of Patent: Jan. 12, 2021

(54) METHOD FOR ANALYZING CEMENT QUALITY IN MULTI-STRING CASED WELLS USING SONIC LOGGING

(71) Applicant: SCHLUMBERGER TECHNOLOGY CORPORATION, Sugar Land, TX (US)

(72) Inventors: Ting Lei, Arlington, MA (US); Bikash Kumar Sinha, Cambridge, MA (US); Smaine Zeroug, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 240 days.

(21) Appl. No.: 15/575,168

(22) PCT Filed: May 18, 2016

(86) PCT No.: PCT/US2016/032961
§ 371 (c)(1),
(2) Date: Nov. 17, 2017

(87) PCT Pub. No.: WO2016/187239
PCT Pub. Date: Nov. 24, 2016

(65) Prior Publication Data
US 2018/0142545 A1 May 24, 2018

Related U.S. Application Data (60) Provisional application No. 62/163,336, filed on May 18, 2015.

(51) Int. Cl.
*G01V 1/50* (2006.01)
*E21B 47/005* (2012.01)
(Continued)

(52) U.S. Cl.
CPC .............. *G01V 1/50* (2013.01); *E21B 47/005* (2020.05); *G01N 29/4418* (2013.01);
(Continued)

(58) Field of Classification Search
CPC .............................. G01V 1/50; E21B 47/0005
(Continued)

(56) References Cited

U.S. PATENT DOCUMENTS

| 3,909,775 A | 9/1975 | Lavigne |
| 4,289,023 A * | 9/1981 | Rader ................. E21B 47/0005 73/12.09 |

(Continued)

FOREIGN PATENT DOCUMENTS

| WO | 2014139593 A1 | 9/2014 |
| WO | 2015108639 A1 | 7/2015 |

(Continued)

OTHER PUBLICATIONS

"Isolating Potential Flow Zones During Well Construction", in American Petroleum Institute Recommended Practice 65—Part 2, first Edition, May 2010, 107 pages.
(Continued)

*Primary Examiner* — Ian J Lobo
(74) *Attorney, Agent, or Firm* — Trevor G. Grove (57) ABSTRACT

Methods and systems are provided for determining cement quality in an outer annulus of a multi-string cased wellbore having an inner annulus of mud. Data from a sonic logging tool is processed to obtain a slowness dispersion. The slowness dispersion is compared to a plurality of model slowness dispersions generated for a plurality of different values for cement quality in the outer annulus. The cement quality in the outer annulus is determined based on the comparison.

18 Claims, 10 Drawing Sheets

(51) Int. Cl.
*G01N 29/44* (2006.01)
*E21B 33/14* (2006.01)

(52) U.S. Cl.
CPC ...... *E21B 33/14* (2013.01); *G01N 2291/0422* (2013.01); *G01N 2291/0423* (2013.01)

(58) Field of Classification Search
USPC ............................................ 367/35; 181/105
See application file for complete search history.

(56) References Cited

U.S. PATENT DOCUMENTS

| | | | |
|---|---|---|---|
| 4,594,691 A | | 6/1986 | Kimball et al. |
| 4,800,537 A | * | 1/1989 | Mount, II ............ E21B 47/0005 181/105 |
| 4,896,303 A | | 1/1990 | Leslie et al. |
| 5,278,805 A | * | 1/1994 | Kimball ..................... G01V 1/48 367/31 |
| 6,611,761 B2 | | 8/2003 | Sinha et al. |
| 6,941,231 B2 | * | 9/2005 | Zeroug .................. G01N 29/07 702/39 |
| 7,095,676 B2 | | 8/2006 | D'Angelo et al. |
| 7,639,563 B2 | | 12/2009 | Wu et al. |
| 7,643,374 B2 | | 1/2010 | Plona et al. |
| 9,533,487 B2 | | 1/2017 | Knauer et al. |
| 9,784,875 B2 | | 10/2017 | Zeroug et al. |
| 9,829,597 B2 | | 11/2017 | Zeroug et al. |
| 10,012,749 B2 | | 7/2018 | Bose et al. |
| 10,138,727 B2 | | 11/2018 | Zeroug et al. |
| 2002/0116128 A1 | * | 8/2002 | Sinha ....................... G01V 1/48 702/6 |
| 2003/0058739 A1 | | 3/2003 | Hsu et al. |
| 2003/0185100 A1 | | 10/2003 | DAngelo et al. |
| 2005/0190651 A1 | | 9/2005 | Plona et al. |
| 2006/0039238 A1 | | 2/2006 | Mandal et al. |
| 2006/0120217 A1 | | 6/2006 | Wu et al. |
| 2006/0233048 A1 | | 10/2006 | Froelich et al. |
| 2006/0235617 A1 | * | 10/2006 | Sinha ....................... G01V 1/50 702/6 |
| 2006/0262644 A1 | | 11/2006 | Schoepf et al. |
| 2007/0206439 A1 | | 9/2007 | Barolak et al. |
| 2009/0168597 A1 | | 7/2009 | Wu et al. |
| 2013/0255937 A1 | | 10/2013 | Barnes et al. |
| 2013/0345983 A1 | | 12/2013 | Guo |
| 2014/0052376 A1 | | 2/2014 | Guo et al. |
| 2015/0003203 A1 | | 1/2015 | Froelich |
| 2015/0198732 A1 | | 7/2015 | Zeroug et al. |
| 2015/0219780 A1 | | 8/2015 | Zeroug et al. |
| 2017/0167241 A1 | * | 6/2017 | Wu .......................... G01V 3/34 |
| 2018/0149019 A1 | | 5/2018 | Bose et al. |
| 2018/0156759 A1 | | 6/2018 | Lei et al. |
| 2019/0055830 A1 | | 2/2019 | Skataric et al. |

FOREIGN PATENT DOCUMENTS

| | | |
|---|---|---|
| WO | 2016003549 A1 | 1/2016 |
| WO | 2016/187239 A1 | 11/2016 |
| WO | 2016/187240 A1 | 11/2016 |
| WO | 2016/187242 A1 | 11/2016 |

OTHER PUBLICATIONS

Ekstrom, M. P., "Dispersion estimation from borehole acoustic arrays using a modified matrix pencil algorithm", 29th Asilomar Conference on Signals, Systems, and Computers, Pacific Grove, California, U.S.A., 1995, pp. 449-453.

Hayman, A. J. et al., "High Resolution Cementation and Corrosion Imaging by Ultrasound", presented at the 1991 SPWLA 32nd Annual Logging Symposium, 1991, 25 pages.

Lang, S. et al., "Estimating slowness dispersion from arrays of sonic logging waveforms", Geophysics, 1987, 52(4), pp. 530-544.

Liu, Y. et al., "Acoustic Guided Waves in Cylindrical Solid-Fluid Structures: Modeling with a Sweeping Frequency Finite Element Method and Experimental Validation", AIP Conference Proceedings, 2017, 36, 8 pages.

Pistre, V. et al., "A Modular Wireline Sonic Tool for Measurements of 3D (Azimuthal, Radial, and Axial) Formation Acoustic Properties", presented at the SPWLA 46th Annual Logging Symposium, New Orleans, Louisiana, U.S.A., 2005, pp. 13 pages.

Pistre, V. et al., "A New Modular Sonic Tool Provides Complete Acoustic Formation Characterization", 2005 SEG International Exposition and Annual Meeting Proceedings, SEG Houston, Texas, U.S.A., 2005, pp. 368-372.

Van Kuijk, R. et al., "A Novel Ultrasonic Cased-Hole Imager for Enhanced Cement Evaluation", IPTC 10546, presented at the International Petroleum Technolgy Conference, Doha, Qatar, 2005, 14 oages.

Xie, et al., "Testing and validating machine learning classifiers by metamorphic testing," The Journal of Systems and Software 84 (2001) pp. 544-558.

Search Report and Written Opinion of related International Patent Application No. PCT/US2016/032963 dated Aug. 16.

Search Report and Written Opinion of International Patent Application No. PCT/US2017/020311 dated Jun. 15, 2017.

Search Report and Written Opinion of International Patent Application No. PCT/US2016/032965 dated Aug. 16, 2016.

* cited by examiner

METHOD FOR ANALYZING CEMENT QUALITY IN MULTI-STRING CASED WELLS USING SONIC LOGGING

RELATED APPLICATIONS

The present application claims the benefit of U.S. Provisional Application Ser. No. 62/163,336, filed on May 18, 2015 and entitled "METHOD FOR ANALYZING CEMENT INTEGRITY IN CASED WELLS USING SONIC LOGGING", which is hereby incorporated by reference herein in its entirety.

This application is related to:
- A PCT Application claiming the benefit of U.S. Provisional Application Ser. No. 62/163,336, filed on May 18, 2016, and entitled "METHOD FOR ANALYZING CEMENT INTEGRITY IN CASED WELLS USING SONIC LOGGING", which is hereby incorporated by reference herein in its entirety;
- A PCT Application claiming the benefit of U.S. Provisional Application Ser. No. 62/163,243, filed on May 18, 2016, and entitled "METHOD FOR ANALYZING CEMENT INTEGRITY IN CASING STRINGS USING MACHINE LEARNING", which is hereby incorporated by reference herein in its entirety; and
- U.S. Provisional Application Ser. No. 62/303,152 filed on Mar. 3, 2016 and entitled "WELL INTEGRITY ANALYSIS USING SONIC MEASUREMENTS OVER DEPTH INTERVAL", which is hereby incorporated by reference herein in its entirety.

TECHNICAL FIELD

The subject disclosure relates to well logging in the oil and gas field. More particularly, the subject disclosure relates to methods utilizing sonic tools for analyzing cement quality behind an outer casing of a doubly cased wellbore.

BACKGROUND

Production wells that are not being used are properly plugged to avoid any oil and gas reservoir fluids from migrating uphole and possibly contaminating other formations or fresh mud aquifers. The process of plugging and abandoning of oil and gas wells requires new technologies to confirm that there is no fluid path in the second cement annulus between the outer casing and formation. Even though existing ultrasonic measurements (50 to 500 kHz) provide a reliable way to diagnose imperfect cement in the first annulus, there are no commercially available measurements that would reliably detect the presence of imperfect cement in the second annulus that might impair hydraulic isolation between the hydrocarbon bearing and adjacent layers of earth. In addition, even where it is possible to confirm the existence of a second cement annulus, there are no existing commercially available measurements capable of providing indications of the quality of that cement.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to methods and systems for determining cement quality in an outer annulus of a multi-string cased wellbore utilizing sonic tool measurements. It has been determined that where the inner annulus of the multi-string cased wellbore is uncemented, the quality of the cement in the outer annulus may be determined by analyzing a Stoneley wave slowness dispersion curve resulting from processing of waveforms detected after the firing of a monopole source, and/or by analyzing a flexural wave slowness dispersion curve resulting from processing of waveforms detected after the firing of a dipole source.

Various embodiments of the present disclosure are directed to a method for determining cement quality in an outer annulus of a multi-string cased wellbore traversing a formation. The method includes placing a sonic tool that includes at least one transmitter and a plurality of receivers within the cased wellbore. The method further includes generating waveforms that travel into a casing and the formation using the at least one transmitter and recording the waveforms at the plurality of receivers to obtain sonic data. The sonic data is processed to obtain a measured slowness dispersion. The measured slowness dispersion is compared to a plurality of model slowness dispersions generated for a plurality of different values for cement quality in the outer annulus. The cement quality is determined based on the comparison.

In some embodiments, a monopole transmitter is placed in an inner casing and sonic data obtained by the receivers spaced from the transmitter are processed to generate slowness dispersion data including at least data representative of a Stoneley wave slowness dispersion. The Stoneley wave slowness dispersion is fit to Stoneley wave slowness dispersions (e.g., Stoneley wave slowness dispersion curves) representing cements of different cement quality (e.g., shear modulii) which were generated by a model. In this manner, a determination may be made as to the shear modulus and the cement quality of the cement in the outer annulus.

Similarly, in other embodiments, a dipole transmitter is placed in the inner casing and waveforms are detected by the receivers spaced from the transmitter. The sonic data obtained by the receivers are processed to generate slowness dispersion data including at least data representative of a flexural wave slowness dispersion. The flexural wave slowness dispersion may then be fit to flexural wave slowness dispersions (e.g., Stoneley wave slowness dispersion curves) representing cements of different cement quality (e.g., different shear modulii) which were generated by a model in order to estimate the shear modulus and cement quality of the cement in the outer annulus.

Additional aspects, embodiments, objects and advantages of the disclosed methods may be understood with reference to the following detailed description taken in conjunction with the provided drawings.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Figure 1A:
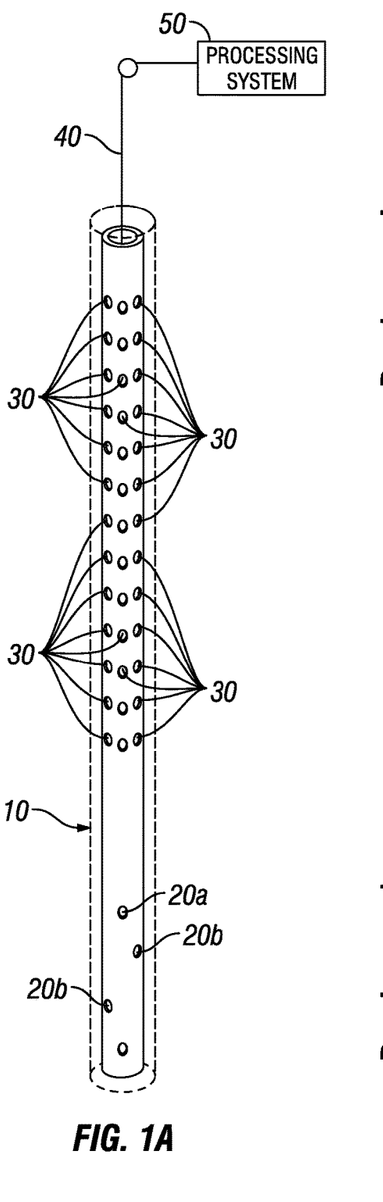
FIGS. 1a-1f are respectively a schematic of a sonic tool, plots of high and low frequency monopole and cross dipole waveform acquisitions, and a slowness dispersion plot.

FIG. 1a shows a schematic of a sonic logging tool 10 that can be used to analyze cement quality in a cased wellbore traversing a formation. In one embodiment, the sonic logging tool 10 may include one or more monopole sources (transmitters) 20a for generating acoustic waveforms that travel into the casing and the formation, one or more sets of dipole sources (transmitter pairs) 20b for generating acoustic waveforms that travel into the casing and the formation, and an array of receivers 30 that record the waveforms to obtain sonic data.

The sonic logging tool 10 may be implemented as a wireline type tool, such as the SONIC SCANNER of Schlumberger Technology Corporation of Sugar Land, Tex., or a logging while drilling (LWD) tool which includes both an axial and azimuthal array of receivers. In one embodiment, the sonic tool has a signal frequency range from 200 Hz to 12 kHz, although tools of different frequency ranges may be utilized. In one embodiment, the sonic tool is used to excite and detect multiple wellbore modes such as a monopole mode and a dipole mode. In one embodiment, the monopole mode can be excited both at low and high frequencies and with far and near (relative to the receiver array) monopole sources and the dipole mode can be excited at two orthogonal directions yielding cross-dipole excitation.

The sonic logging tool in FIG. 1a is a wireline logging tool 10. The logging tool 10 is lowered into the wellbore on a wireline 40. The wireline 40 can be used to communicate with a processing system 50 at a surface location. The processing system 50 can be used to control operation of the wireline logging tool 10 and/or process data acquired by the wireline logging tool (e.g., according to the methods described herein).

Figure 1B:
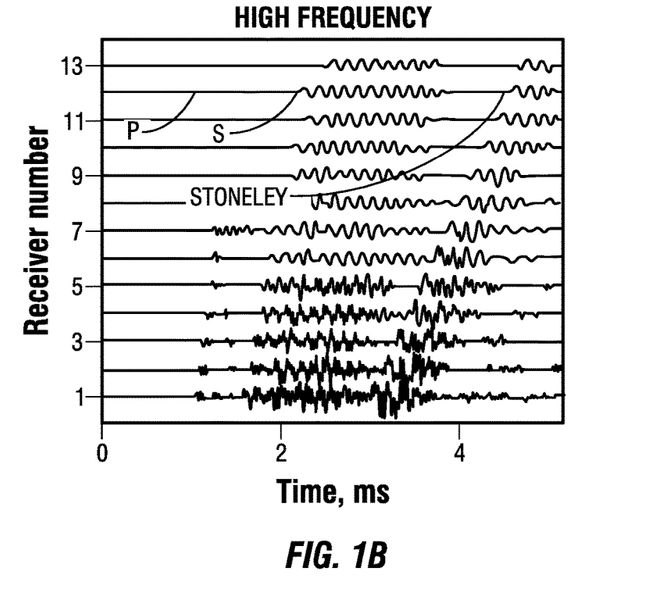
Figure 1C:
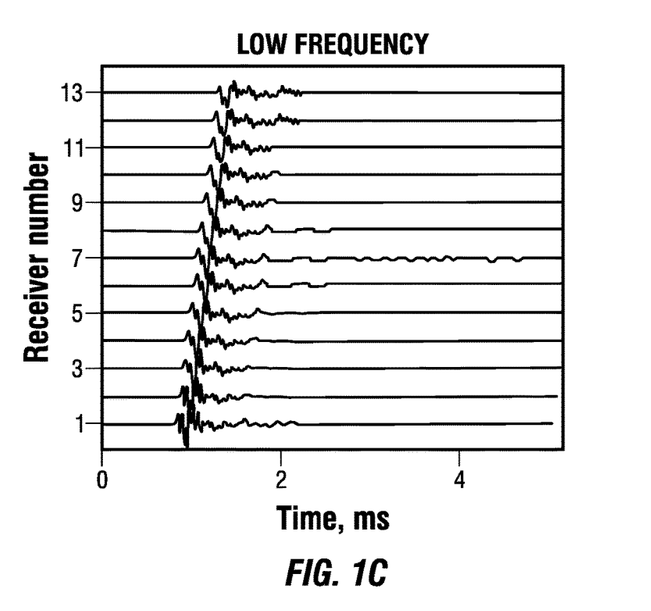
Figure 1D:
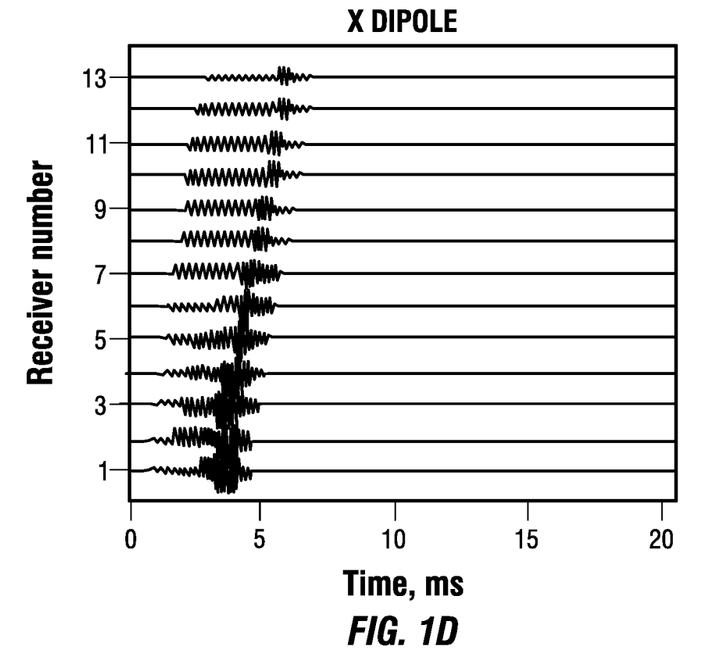
Figure 1E:
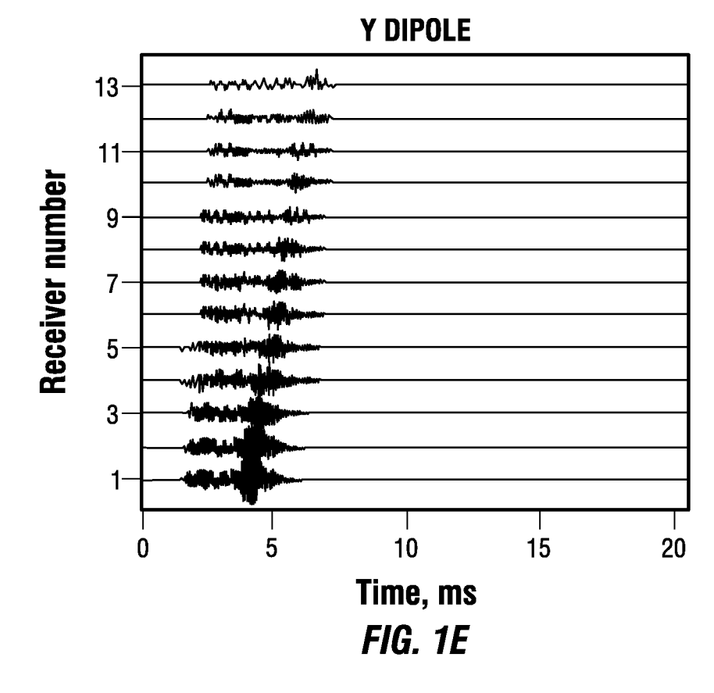
Figure 1F:
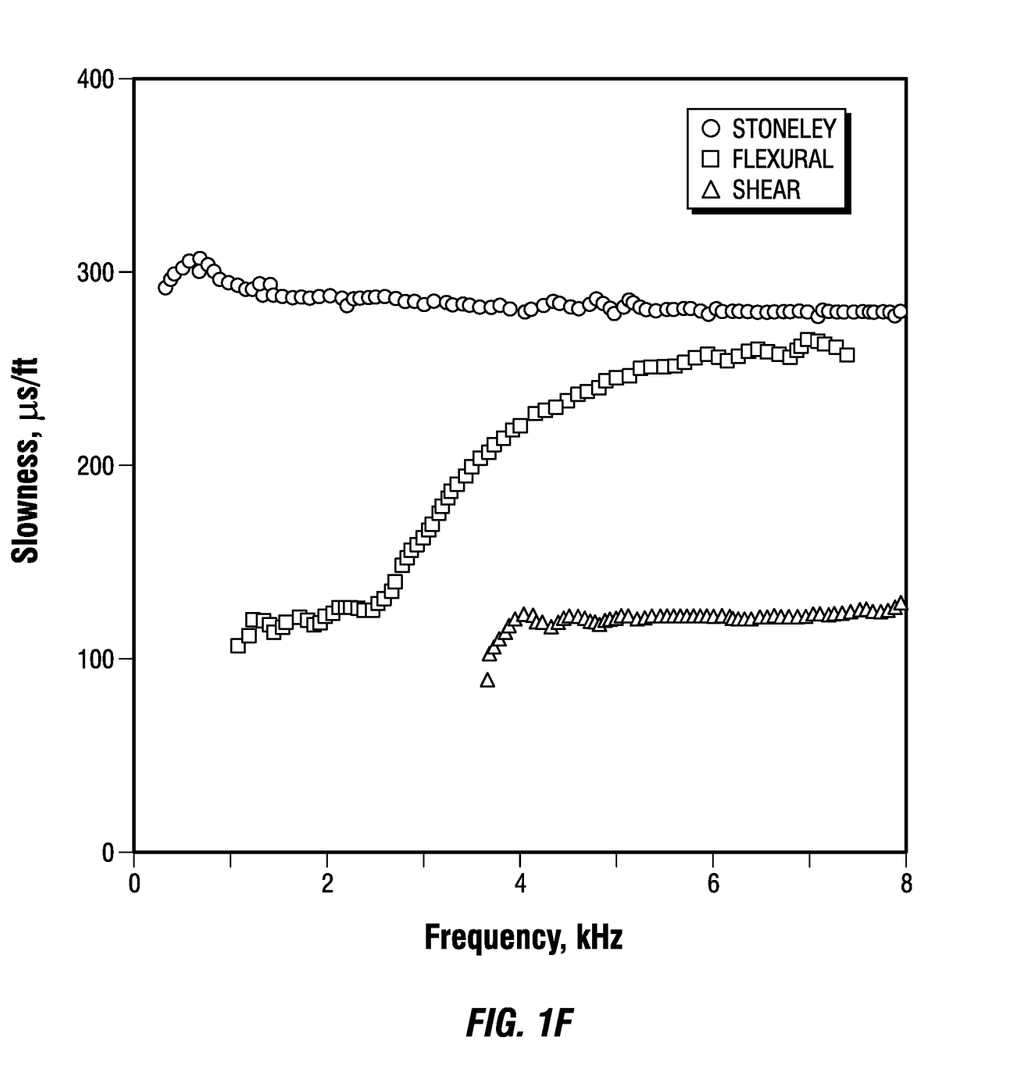

FIGS. 1b and 1c show signals received by spaced receivers resulting from high and low frequency monopole source signals while FIGS. 1d and 1e show respectively the resulting x dipole and y dipole receiver signals. FIG. 1f is a slowness dispersion plot which reveals the presence of three wellbore-guided "modes": (i) a casing-formation Stoneley wave (more commonly referred to simply as a Stoneley wave) having a slowness of approximately 300 microseconds/ft, (ii) a casing-formation flexural wave (more commonly referred to simply as a flexural wave) which has varying slownesses depending upon frequency, and (iii) a shear wave at a slowness of approximately 120 microseconds/ft. Both the casing-formation Stoneley wave and the casing-formation flexural wave are so named because the casing and the formation impact the slowness of the wave. It will be appreciated that using a SONIC SCANNER tool or the equivalent thereof provides measurements that are rich in data as multiple wellbore modes are excited and detected using a multiplicity of transmitters and individual recordings of receivers in an axial and azimuthal array.

Figure 2A:
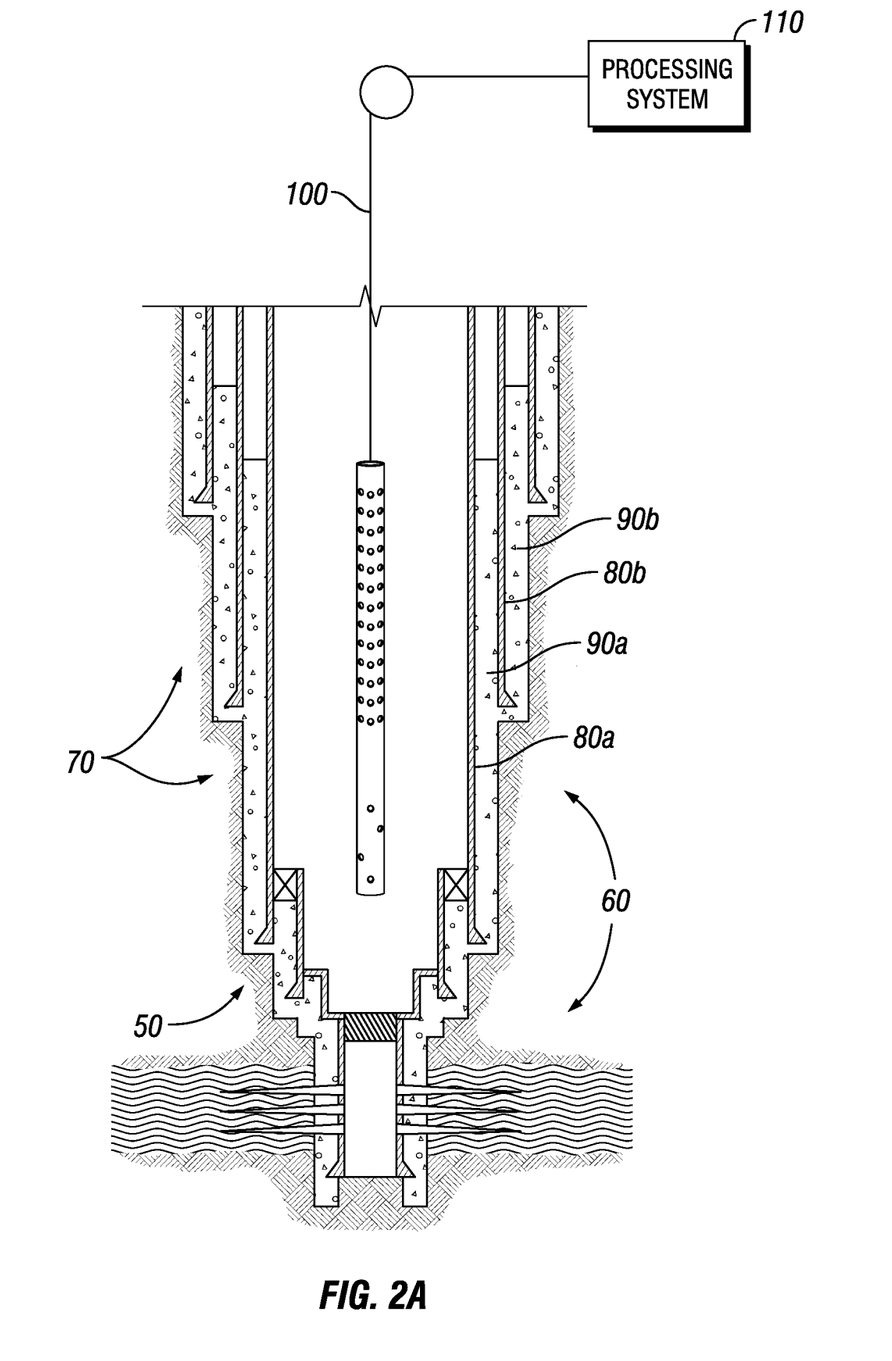
FIGS. 2a-2e are respectively a schematic of the sonic tool of FIG. 1a in a multi-string cased wellbore, and schematics of cross-sections through the wellbore representing four different states of two different annuli.

Turning to FIG. 2a, the sonic logging tool 10 is shown located in a plugged-in well 50 traversing a formation 60. The sonic tool 10 is suspended on a wireline 100 and in communication with a processing system 110. The well is shown to be cased with a multiple casing string 70. For purposes of illustration, a particular segment of the well is shown to have a first casing 80a and a second casing 80b with first casing 80a surrounded by an annulus 90a and second casing 80b surrounded by an annulus 90b. For part of its length, annulus 90a is located between casing 80a and casing 80b. For part of its length, annulus 90b is located between casing 80b and the formation 60.

Figure 2B:
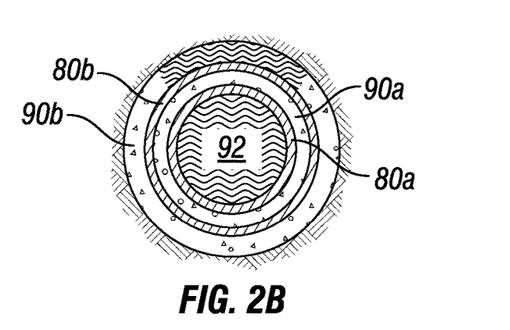
Figure 2C:
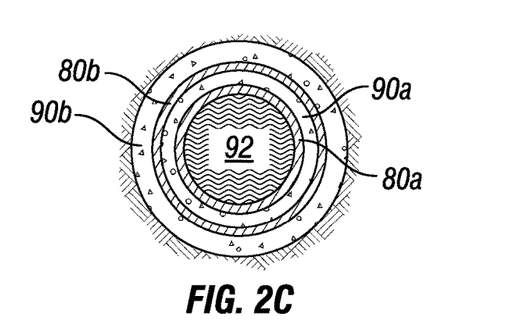
Figure 2D:
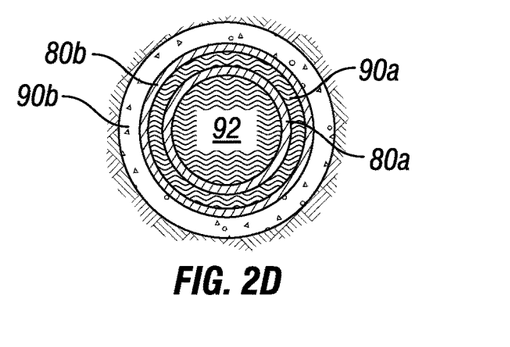
Figure 2E:
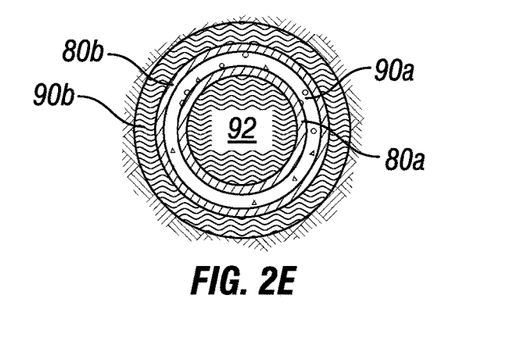

It will be appreciated that the annuli 90a, 90b seen in FIG. 2a may assume various states such as fully cemented, liquid-filled, cemented only along part of the circumference, etc. For purposes herein, the term "liquid" is to be understood broadly to include drilling mud that may be found inside the casings and annuli. FIGS. 2b-2e show some of these scenarios. For example, FIG. 2b shows an inner annulus 90a of cement and an an outer annulus 90b partially of cement and partially of liquid (mud). FIG. 2c shows both inner annulus 90a and outer annulus 90b fully cemented. FIG. 2d show inner annulus 90a with liquid (mud) and outer annulus 90b fully cemented which is of particular interest as discussed hereinafter, while FIG. 2e shows inner annulus 90a fully cemented and outer annulus 90b containing liquid (mud). In all four figures, the inner casing (pipe) 80a is filled with mud 92.

It will be appreciated that the status of the annuli 90a, 90b impact the sonic data received by the receivers of the tool. In addition, as set forth hereinafter in more detail, the characteristics of the mud or cement located in the annuli will impact the sonic data received by the receivers of the tool. Thus, by way of example, it has been found that the shear modulus of the cement can significantly impact certain modes.

In addition to the variables associated with the annuli, it should be appreciated that the formation acoustics, and the pipe (casing) weight and size are variables that may be dealt with in analyzing sonic data. For example, the acoustic properties of the formation are often distinguished by the speed of signals in the formation. Thus, formations are described as being super or very fast, fast, intermediate, and slow. The type of formation (slow versus fast) imposes constraints on the ranges of frequencies/slownesses in which to search for distinguishing features as described hereinafter. Thus, when generating possible scenarios of a formation for generating model dispersion curves it will be appreciated that the number of variables and the number of values for those variables will dictate the number of scenarios considered.

Figure 3A:
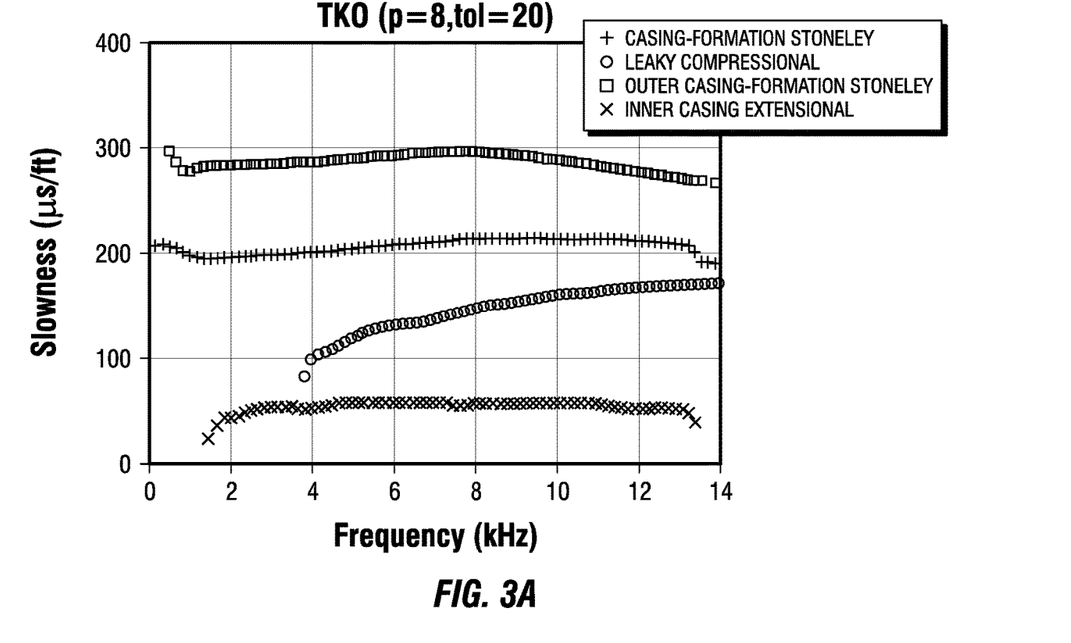
FIGS. 3a and 3b are respectively a monopole generated slowness dispersion plot and a monopole generated attenuation dispersion plot for the wellbore represented by FIG. 2d.
Figure 3B:
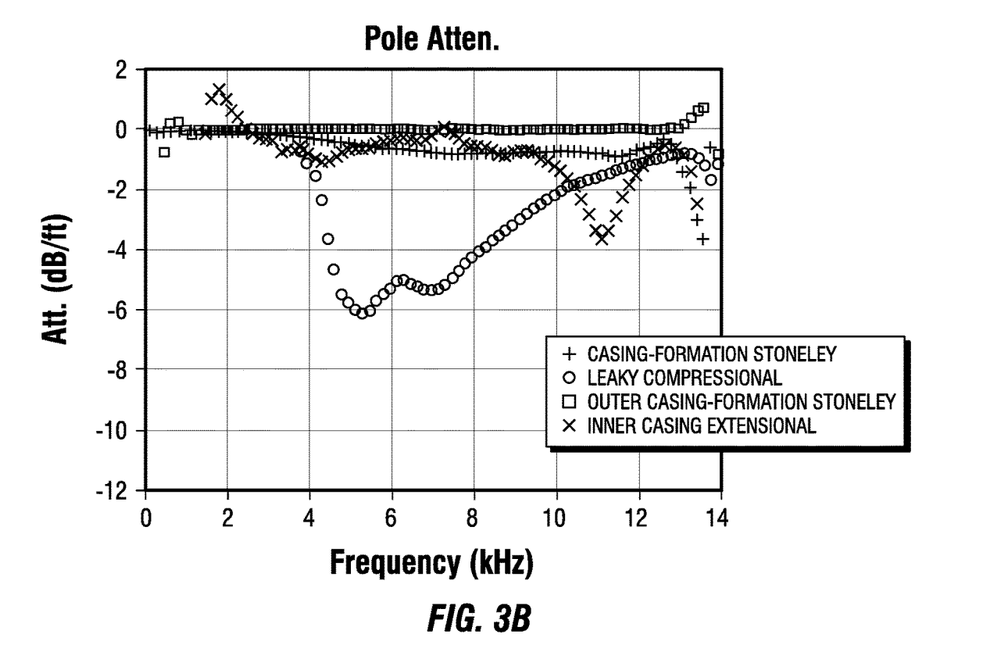

In one aspect, and as previously indicated, the arrangement of the well shown in FIG. 2d with an inner annulus 90a having liquid and outer annulus 90b fully cemented is of particular interest herein. This arrangement can be identified using, for example, sonic data, as described in a PCT Application claiming the benefit of U.S. Provisional Application Ser. No. 62/163,336, filed on May 18, 2016, and entitled "METHOD FOR ANALYZING CEMENT INTEGRITY IN CASED WELLS USING SONIC LOGGING", which is hereby incorporated by reference herein in its entirety When a sonic tool 10 with a monopole source 20 is run in a well having a configuration shown in FIG. 2d, data obtained by detectors 30 may be processed using TKO processing, such as described in Lang, S., et al., "Estimating Slowness Dispersion from Arrays of Sonic Logging Waveforms," *Geophysics*, Vol. 52, no. 4, pp. 53-544, April 1987, and Ekstrom, M. P., "Dispersion Estimation from Borehole Acoustic Arrays Using a Modified Matrix Pencil Algorithm", *Proc. 29$^{th}$ Asilomar Conference on Signals, Systems and Computing*, Vol. 2, pp. 449-453, November 1995. Results of the TKO processing are shown in FIGS. 3a and 3b with four dispersion modes being identified in the slowness dispersion plot of FIG. 3a and the attenuation dispersion plot of FIG. 3b. The four modes are identified as (i) a casing-formation Stoneley mode (for purposes herein also called an inner Stoneley mode), (ii) a leaky compressional mode, (iii) an outer casing-formation Stoneley mode (for purposes herein also called an outer Stoneley mode, as the Stoneley wave of the outer Stoneley mode travels outside the Stoneley wave of the inner Stoneley mode), and (iv) an inner casing extensional mode. As set forth hereinafter, the inner Stoneley mode is of particular interest herein, while the outer Stoneley mode may be of interest as well.

Figure 4A:
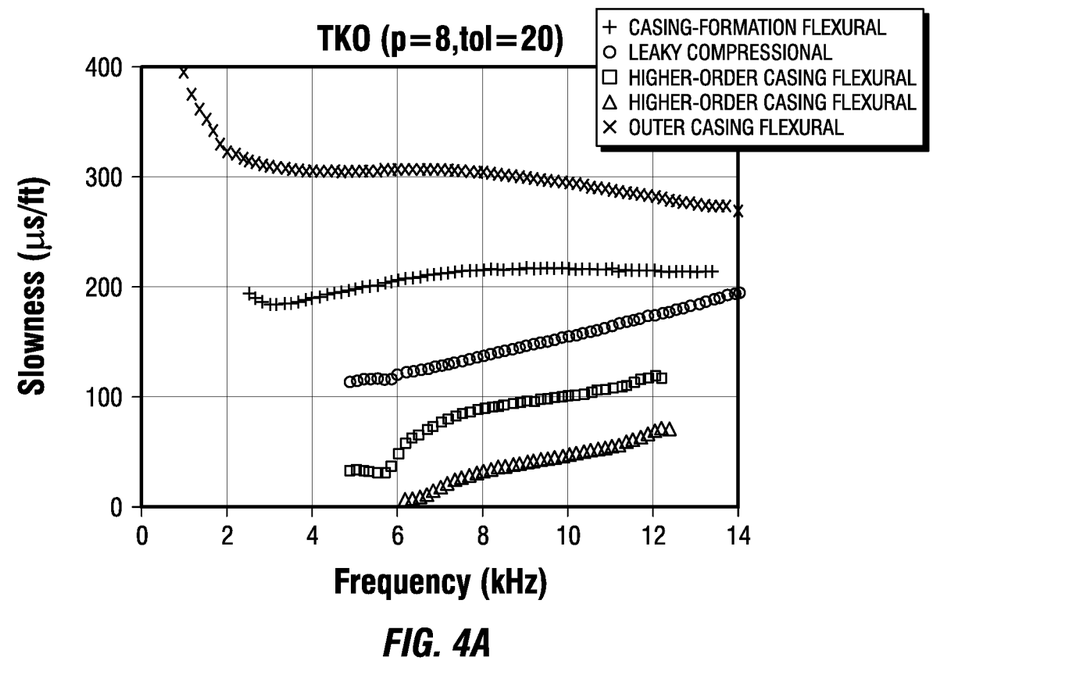
FIGS. 4a and 4b are respectively a dipole generated slowness dispersion plot and a dipole generated attentuation dispersion plot for the wellbore represented by FIG. 2d.
Figure 4B:
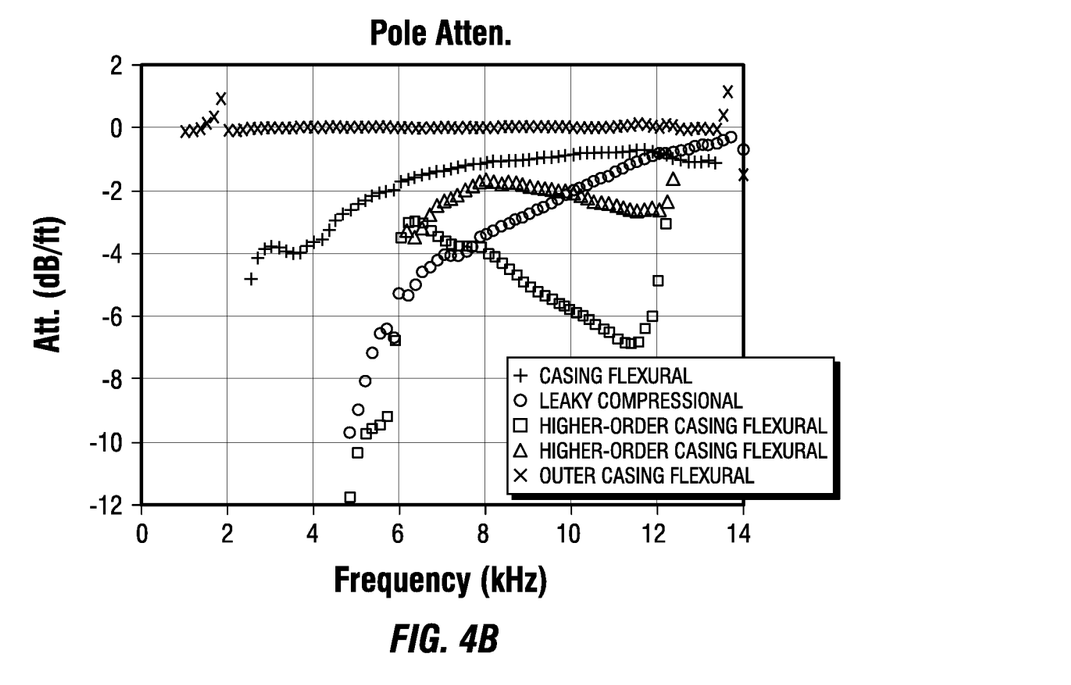

Similarly, when a dipole source is run in the well having a configuration shown in FIG. 2d, data obtained by receivers may be processed using TKO processing with results such as seen in FIGS. 4a and 4b. In FIGS. 4a and 4b, five modes are identified as a casing-formation flexural mode (for purposes herein also called an inner flexural mode), a leaky compressional mode, two higher-order casing-formation flexural modes, and an outer casing-formation flexural mode (for purposes herein also called an outer flexural mode). As set forth hereinafter, the inner flexural mode is of particular interest herein, while the outer flexural mode may be of interest as well.

Figure 5A:
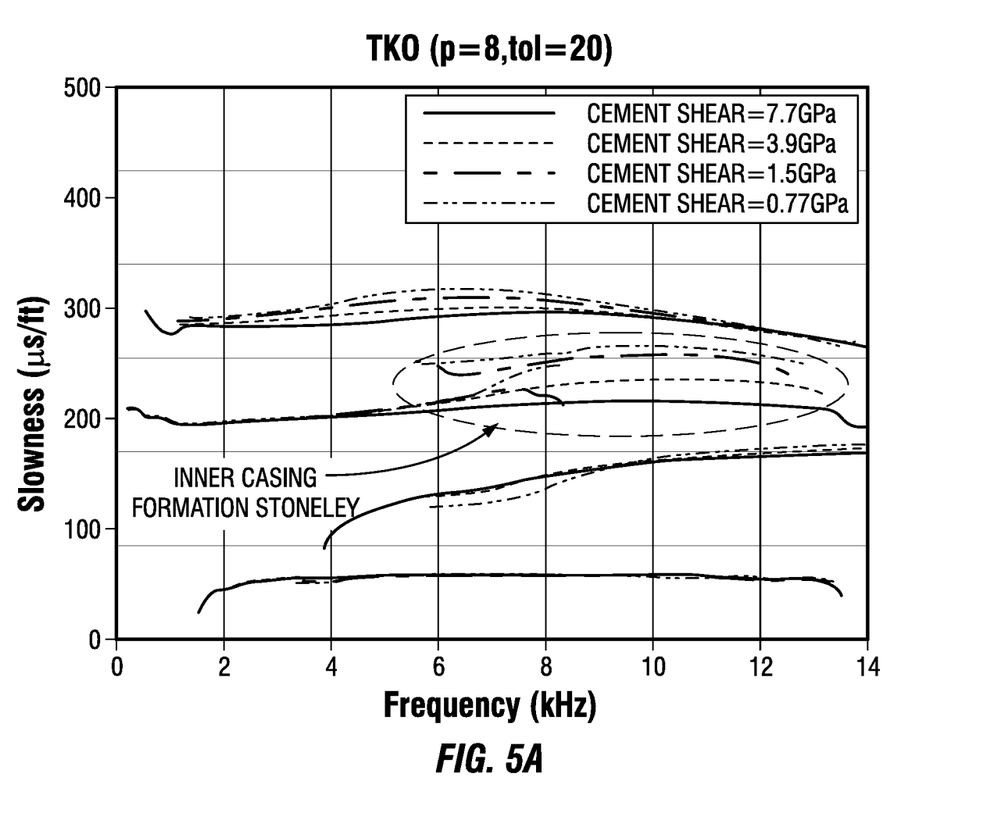
FIGS. 5a and 5b are respectively monopole and dipole generated slowness dispersion plots generated by a model at four different cement shear values.
Figure 5B:
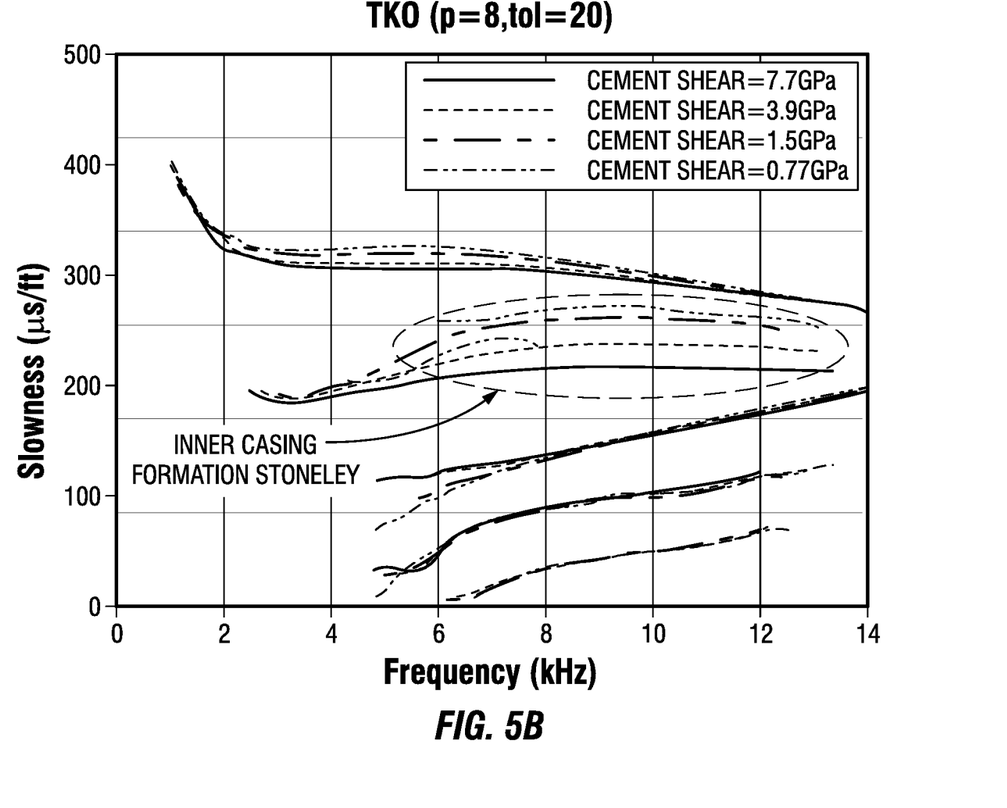

Turning now to FIGS. 5a and 5b are slowness dispersion plots generated from a model where the only unknown parameter is the shear modulus of the cement. Other model parameters, such as (i) the casing pipe geometry and density, (ii) the mud compressional speed and density, (iii) the formation compressional and shear slownesses, and (iv) the formation density, are known. The slowness dispersion plots of FIGS. 5a and 5b represent slowness dispersions that would result from TKO processing of monopole and dipole source signals respectively. More particularly, the plots of FIGS. 5a and 5b were generated for wells of known casing thicknesses and materials, with an inner annulus of mud of known mud density, and an outer annulus of cement but of unknown cement shear modulus. Thus, the shear modulus of the cement was varied over a range, and the dispersion results of four different shear modulii (0.77 GPa, 1.5 GPa, 3.9 GPa, and 7.7 GPa) are shown. As seen in FIGS. 5a and 5b, when the shear modulus of the cement is varied in the model, the inner Stoneley and inner flexural wave dispersions are distinct, particularly at frequencies above 5 kHz. According to embodiments, and as described in detail below, because of the impact of the shear modulus of the cement on these modes, one or both of these inner Stoneley and inner flexural dispersions may be used to quantify the shear modulus of the cement in the outer annulus of the well. In particular, the waveforms detected by the receivers in the wellbore are processed using TKO processing or the like to generate a (inner) casing-formation Stoneley and/or (inner) casing-formation flexural slowness dispersion curve, and the curve(s) is/are fit using a fitting technique such as least-squares-fitting to a plurality of curves derived from a model which accounts for cement shear modulus in order to find a best fit. The best fit thereby provides an estimated cement shear modulus value.

Figure 6:
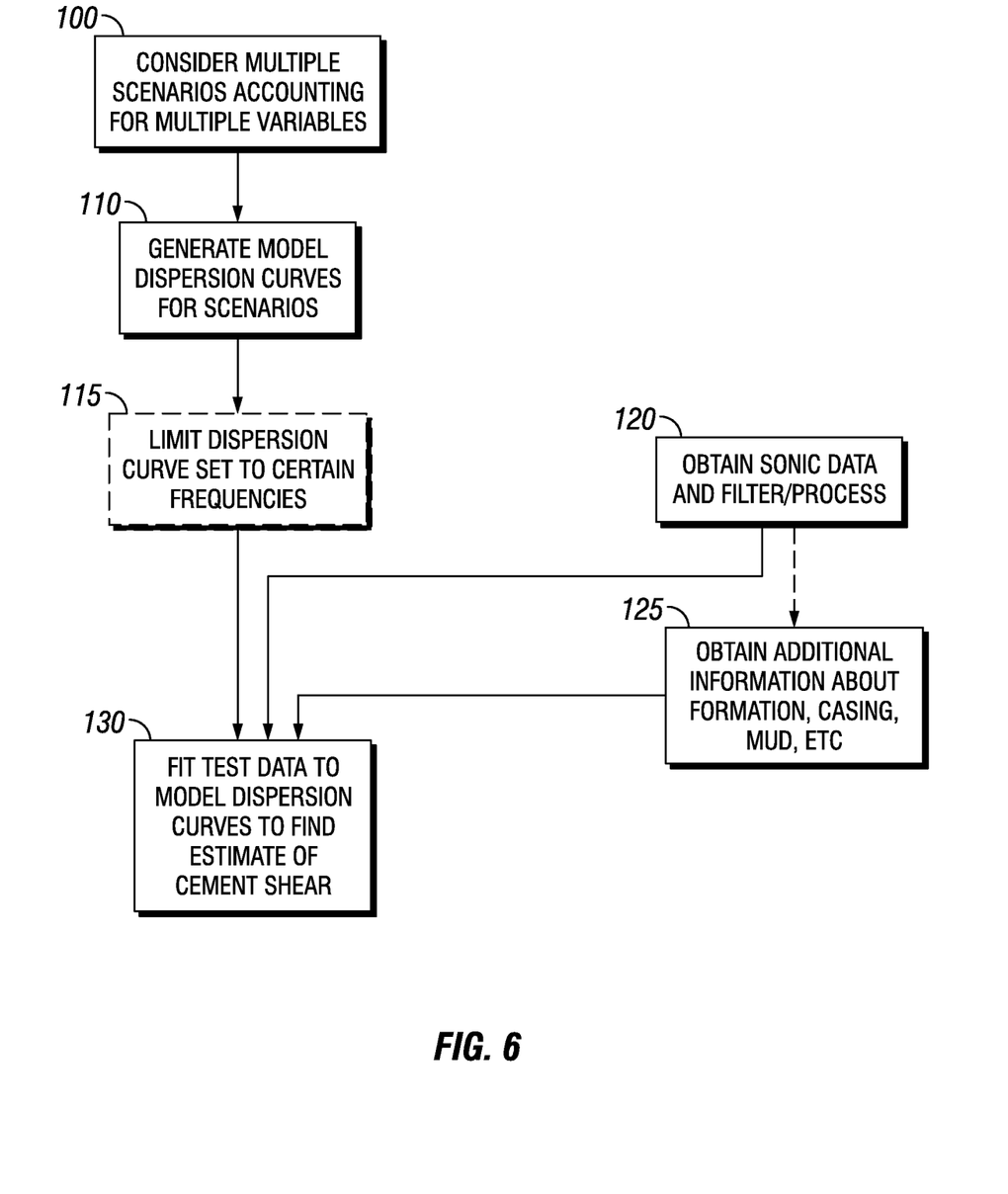
FIG. 6 is a flow-chart of a method of an embodiment for determining an estimate of the cement shear modulus of the cement in the outer annulus of a multi-string cased well.

Turning to FIG. 6, a flow-chart is provided of a method for determining an estimate of the cement shear modulus of the cement in the outer annulus of a multi-string cased wellbore. At 100, a set of possible scenarios regarding formation and casing variables are considered. For example, assume an arrangement where the inner annulus is mud and the outer annulus is cement. For a sequence of formation parameters that include compressional and shear slownesses and mass density, and known model parameters for the casing including its geometry, compressional and shear slownesses and mass density, and mud model parameters that include its compressional slowness and density, a plurality of cement shear values are considered to compute a sequence of model dispersion curves. At 110, model dispersion curves are generated for the set of scenarios (i.e., for the different combinations of variables). Thus, by way of example, the model dispersion curves might be generated that assume four different formation slownesses (e.g., acoustically slow, intermediate, fast and super-fast), four different mud weights, and four different cement shear modulii (e.g., 0.77 GPa, 1.5 GPa, 3.9 GPa, and 7.7 GPa in order to generate sixty-four scenarios and resulting model dispersion curve sets. If desired, the model dispersion curve sets may be limited to only inner Stoneley and/or inner flexural dispersion curves. At 115, if desired, the model dispersion curve sets may be limited to frequencies of 5 kHz or more, or to a desired range.

In one aspect, it should be appreciated that while the model dispersions (also called templates) may be generated by modeling possible scenarios of variables associated with one or more of the annuli, formation, casing, and mud, the model dispersions may also be generated through the use of controlled experiments on artificial formations or on well-characterized field data.

At 120, monopole and/or dipole sonic data obtained from a sonic tool located in a wellbore at a depth of interest are filtered and processed, e.g., using TKO processing such as described in Lang, S., et al., "Estimating Slowness Dispersion from Arrays of Sonic Logging Waveforms," *Geophysics*, Vol. 52, no. 4, pp. 530-544, April 1987, and Ekstrom, M. P., "Dispersion Estimating from Borehole Acoustic Arrays Using a Modified Matrix Pencil Algorithm", *Proc. 29$^{th}$ Asilomar Conference on Signals, Systems and Computing*, Vol. 2, pp. 449-453, November 1995, which are hereby incorporated by reference herein in their entireties, in order to extract measured slowness and, if desired, measured attenuation dispersions.

At 125, additional information regarding the formation, pipe, and mud are identified through other tests or through previous knowledge (e.g., the formation mass density, the formation compressional and shear slownesses, the pipe geometry, such as inner and outer radii, the pipe mass density, the pipe compressional and shear slownesses, and the mud density, and the mud compressional slowness). Then, at 130, using the information from 125, a set of model dispersion curves corresponding to the identified formation, pipe, and mud properties are selected and the measured inner Stoneley and/or inner flexural curves found at 120 are compared to the model dispersion curves to find a closest fit.

Based on the fit, an estimate of cement shear is made. For example, if the fit is almost exact with a particular curve representing a particular cement shear value, the cement shear value is estimated to be that particular cement shear value. Alternatively, if the fit is nearly the same for two different curves representing two different cement shear values (e.g., 1.5 GPa and 3.9 GPa), the estimated cement shear may be chosen to be half-way between those two values (e.g., 2.7 GPa). Similarly, based on relative fits relative to two different curves, values may be chosen between the values represented by different curves (e.g., interpolating between the two).

Furthermore, in various embodiments, an interative and qualitative process can be used to determine the cement shear modulus. A measured slowness dispersion that is slower (or faster) than the model slowness dispersion at higher frequencies (between 4 to 8 kHz) implies that the chosen cement shear modulus used to produce the model dispersion curve is larger (or smaller) than the actual cement shear modulus in the second annulus, and vice-versa. So, if differences between the modeled and measured dispersions are large at higher frequencies for a particular choice of cement shear modulus, the next iterative model dispersion curve is produced with a larger or smaller value of the cement shear modulus to reduce observed differences between the measured and modeled dispersions. This iterative process can be continued until differences between the measured and modeled dispersions are reduced to an acceptable range at higher frequencies for a chosen value of cement shear modulus.

Cement shear modulus is a measure of cement quality. In particular, the cement shear modulus represents the shear rigidity of the cement fill in the second annulus. The relationship between cement shear modulus can vary based on the cement type and composition. The relationship between cement shear modulus and cement quality can be determined through laboratory or field experiments. Typically, a greater value of shear modulus corresponds to better cement quality (e.g., solid cement and/or cement bonded to casing), whereas values of shear modulus closer to 0 correspond to poor cement quality (e.g., liquid filled annulus, cement in slurry form, and/or cement debonded from the casing).

In one aspect, fitting for the inner Stoneley and inner flexural modes is conducted at frequencies of approximately 5 kHz and more.

In another embodiment, templates of the outer Stoneley and/or outer flexural curves are generated (such as seen in FIGS. 5a and 5b), and instead of (or in addition to) processing the data to generate and fit the inner Stoneley and/or inner flexural curve, the data is processed to generate the outer Stoneley and/or the outer flexural curve which may then be fit to corresponding model dispersions. In one aspect, if outer Stoneley and/or outer flexural curves are utilized, the fitting may be conducted at frequencies of between approximately 4 kHz and 8 kHz, where the separation between the model curves is greatest.

Some of the methods and processes described above, such as (i) filtering and TKO processing of sonic signals and (ii) the fitting of dispersion curves to model curves, are performed by a processing system. The term "processing system" should not be construed to limit the embodiments disclosed herein to any particular device type or system. The processing system may be a computer, such as a laptop computer, a desktop computer, or a mainframe computer. The processing system may include a graphical user interface (GUI) so that a user can interact with the processing system. The processing system may also include one or more processors (e.g., microprocessors, microcontrollers, digital signal processors, or general purpose computers) for executing any of the methods and processes described above.

The processing system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Any of the methods and processes described above can be implemented as computer program logic for use with the processing system. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the processing system. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Accordingly, all such modifications are intended to be included within the scope of this disclosure.

What is claimed is:

1. A method for determining cement quality in an outer annulus of a multi-string cased wellbore traversing a formation, wherein the multi-string cased wellbore comprises an inner annulus of fluid, the method comprising:
    placing a sonic tool comprising at least one transmitter including a monopole source and a dipole source, and a plurality of receivers within the cased wellbore, wherein the inner annulus includes fluid and the outer annulus is fully cemented;
    generating waveforms that travel into the casing and the formation using the at least one transmitter;
    recording the waveforms at the plurality of receivers to obtain sonic data;
    processing the sonic data to obtain a measured slowness dispersion;
    generating a plurality of model slowness dispersions for a plurality of different values for cement quality in the outer annulus;
    limiting the plurality of model slowness dispersions to one or more selected frequencies to identify a subset of the plurality of model slowness dispersions; and comparing the measured slowness dispersion to the subset of the plurality of model slowness dispersions for cement quality in the outer annulus to determine cement quality.

2. The method of claim 1, wherein the comparing comprises fitting the measured slowness dispersion to the plurality of model dispersions.

3. The method of claim 2, wherein the fitting comprises fitting at frequencies of at least approximately 5 kHz.

4. The method of claim 2, wherein the comparing comprises selecting a closest fit.

5. The method of claim 1, wherein the plurality of model slowness dispersions are generated for a plurality of different formation slowness values.

6. The method of claim 5, further comprising:
selecting a specific model slowness dispersion of the plurality of model slowness dispersions based on a known formation slowness for use in the comparing.

7. The method of claim 1, wherein the slowness dispersion is a Stoneley slowness dispersion and the plurality of model slowness dispersions are model Stoneley slowness dispersions.

8. The method of claim 7, wherein the Stoneley slowness dispersion is an inner Stoneley slowness dispersion and the plurality of model Stoneley slowness dispersions are model inner Stoneley slowness dispersions.

9. The method of claim 8, wherein the fitting comprises fitting at frequencies of at least approximately 5 kHz.

10. The method of claim 7, wherein the Stoneley slowness dispersion is an outer Stoneley slowness dispersion and the plurality of model Stoneley slowness dispersions are model outer Stoneley slowness dispersions.

11. The method of claim 10, wherein the fitting comprises fitting at frequencies of between at least 4 kHz and 8 kHz.

12. The method of claim 1, wherein the slowness dispersion is a flexural slowness dispersion and the plurality of model slowness dispersions are model flexural slowness dispersions.

13. The method of claim 12, wherein the flexural slowness dispersion is an inner flexural slowness dispersion and the plurality of model flexural slowness dispersions are model inner flexural slowness dispersions.

14. The method of claim 13, wherein the fitting comprises fitting at frequencies of at least approximately 5 kHz.

15. The method of claim 12, wherein the flexural slowness dispersion is an outer flexural slowness dispersion and the plurality of model flexural slowness dispersions are model outer flexural slowness dispersions.

16. The method of claim 15, wherein the fitting comprises fitting at frequencies of between at least 4 kHz and 8 kHz.

17. The method of claim 1, wherein the cement quality comprises a cement shear modulus value.

18. A system for determining cement quality in an outer annulus of a multi-string cased wellbore traversing a formation, the system comprising:
a sonic tool comprising (i) at least one transmitter including a monopole source and a dipole source, configured to generate waveforms that travel into a casing and the formation of the multi-string cased wellbore and (ii) a plurality of receivers configured to record the waveforms to obtain sonic data, wherein an inner annulus includes liquid and the outer annulus is fully cemented;
a processing system configured to:
process the sonic data to obtain a measured slowness dispersion;
generate a plurality of model slowness dispersions for a plurality of different values for cement quality in the outer annulus;
limit the plurality of model slowness dispersions to one or more selected frequencies to identify a subset of the plurality of model slowness dispersions; and
compare the measured slowness dispersion to the subset of the plurality of model slowness dispersions for cement quality in the outer annulus to determine cement quality.

* * * * *